UNITED STATES PATENT OFFICE.

CHARLES A. SEELY, OF NEW YORK, N. Y.

IMPROVEMENT IN SOLIDIFIED COLLODION.

Specification forming part of Letters Patent No. 79,261, dated June 23, 1868.

*To all whom it may concern:*

Be it known that I, CHARLES A. SEELY, of New York, in the county of New York, in the State of New York, have invented a new and Improved Solidified Collodion; and I do hereby declare that the following is a full and exact description thereof, reference being had to the accompanying drawing.

The nature of my invention consists in dissolving in the liquid collodion a substance compatible with the ingredients of the collodion and which on the evaporation of the solvent is left incorporated with the hardened collodion, conferring upon it greater toughness and flexibility.

To enable others skilled in the art to make and use my invention, I will now describe it more minutely.

By collodion I mean gun-cotton dissolved in a mixture of ether and alcohol, or in other appropriate solvent. By hardened collodion I mean the solid residue left on the evaporation of the solvent, when the said residue is used as a substitute for ivory, horn, shell, and similar natural products. Now, to prepare my improved hardened collodion, I take one pound of gun-cotton, one-half ounce of nitro-glucose, and dissolve in one gallon of a suitable solvent. After the solution has become thorough and clear I evaporate the solvent in such manner as to get the solid residue in the form of a sheet or other form suitable for manufacture. I give the above proportions as an illustration of what may be found generally most useful. But it should be understood that the proportions may be widely varied. Thus the amount of solvent may be indefinitely increased or diminished without materially changing the character of the hardened product. For the sake of economy, however, the solvent should be used in the smallest quantity which can effect the solution. The purpose of the nitro-glucose is to increase the flexibility and toughness, and to counteract the brittleness of the ordinary hardened collodion. The hardness and brittleness of ordinary hardened collodion varies greatly with the different qualities of soluble cotton, and the amount of nitro-glucose should be varied accordingly, as well as to suit the specific purpose to which the product is to be put. The range of the amount of nitro-glucose which may be used practically with one pound of gun-cotton may be one-eighth ounce to four ounces.

To the collodion containing nitro-glucose I add, as is customary for the ordinary hardened collodion, resinous coloring and other ingredients to suit the specific kind of article which I desire to produce from it. The new substance which I bring into the compound is the nitro-glucose, and the hardened collodion containing nitro-glucose is, in brief, my invention.

What I claim, and desire to secure by Letters Patent, is—

The compound of collodion and nitro-glucose prepared and compounded substantially as described.

CHARLES A. SEELY.

Witnesses:
JNO. W. WIGHT.
CHARLES H. DRINER.